United States Patent [19]

Kang et al.

[11] Patent Number: 5,687,012

[45] Date of Patent: Nov. 11, 1997

[54] HOLOGRAM IN WHICH A PLURALITY OF AREAS ARE SET AND HOLOGRAPHY SYSTEM TO WHICH HOLOGRAM IS APPLIED

[75] Inventors: Der-Kuan Kang, Kuki; Toshiki Toda, Satte, both of Japan

[73] Assignee: Toppan Printing Co., Ltd., Tokyo, Japan

[21] Appl. No.: 520,668

[22] Filed: Aug. 29, 1995

[30] Foreign Application Priority Data

Aug. 31, 1994 [JP] Japan .................. 6-207742

[51] Int. Cl.$^6$ ........................................ G03H 1/00
[52] U.S. Cl. ...................... 359/2; 359/10; 359/25; 359/28; 283/86
[58] Field of Search ...................... 359/2, 10, 22, 359/25, 28, 32, 33; 283/86

[56] References Cited

U.S. PATENT DOCUMENTS

| | | | |
|---|---|---|---|
| 4,265,509 | 5/1981 | McMahon | 359/25 |
| 4,547,037 | 10/1985 | Case . | |
| 4,889,780 | 12/1989 | Cosner | 430/1 |
| 5,486,933 | 1/1996 | Shindo et al. | 359/2 |

FOREIGN PATENT DOCUMENTS 5-173469  7/1993  Japan .

*Primary Examiner*—D. M. Dzierzynski
*Assistant Examiner*—Darren E. Schuberg
*Attorney, Agent, or Firm*—Armstrong, Westerman, Hattori, McLeland & Naughton

[57] ABSTRACT

A hologram is formed using a grating and a second hologram serving as an image hologram. The grating is constituted by a plurality of areas whose spatial frequencies and diffraction directions are different from each other. This grating is formed using a grating array and a mask. The second hologram has a plurality of areas each of which records information or image (e.g., ID data) serving as a recording target as an element hologram. The second hologram is formed using a Fresnel hologram serving as a first hologram. The first hologram can also be formed using a mask and a diffuser on which ID data is projected. On the hologram, information (pattern or image) is recorded with each of reference light components having different directions corresponding to the different small areas. Even if illumination light having a uniform wavefront is irradiated on this hologram, it is difficult to detect all the information (pattern and image).

5 Claims, 7 Drawing Sheets

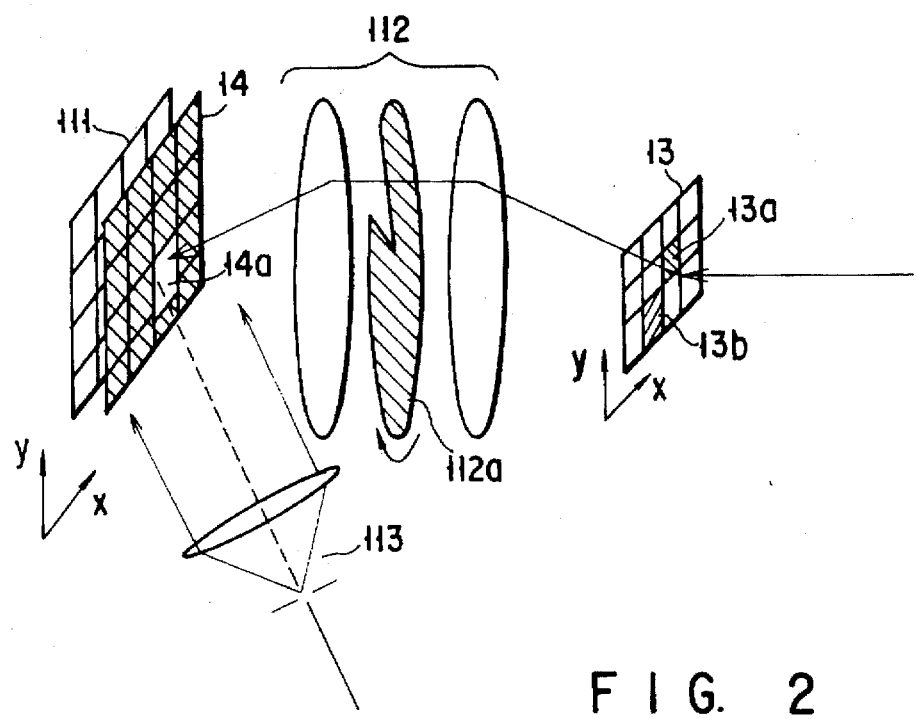
F I G. 2
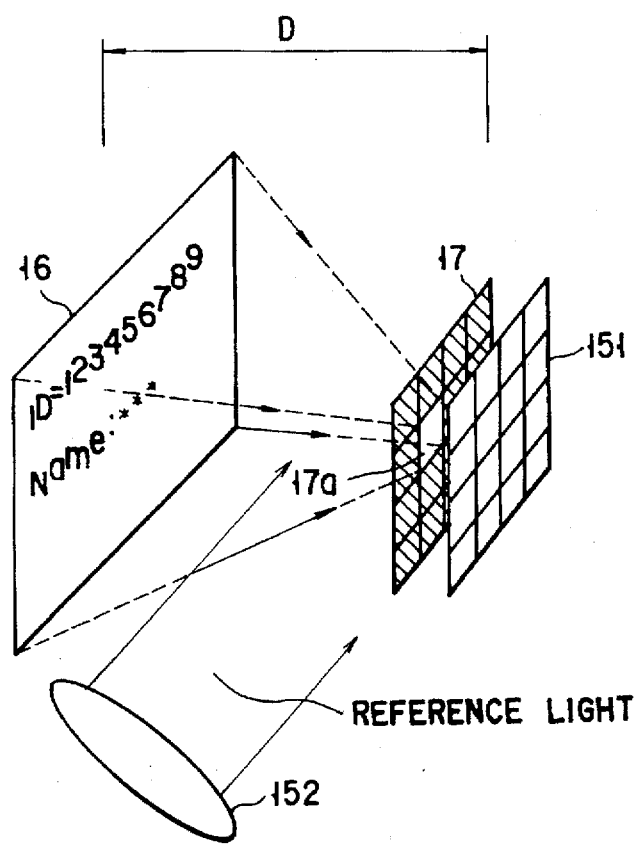
F I G. 3

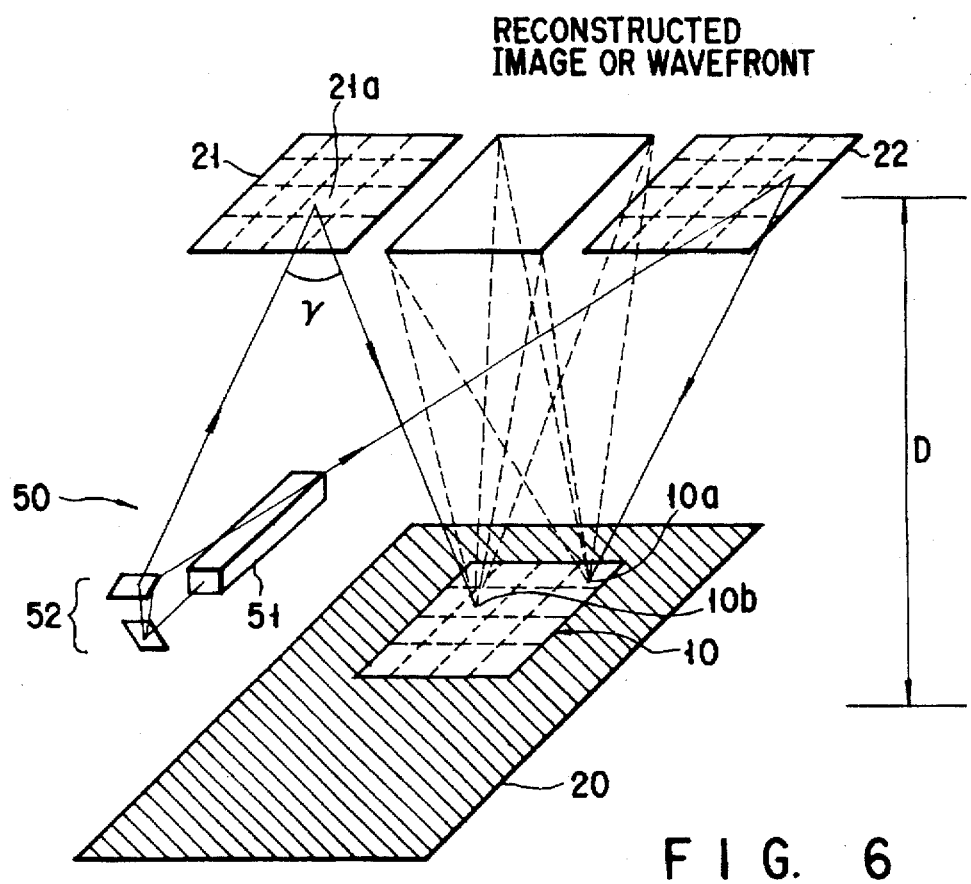
F I G. 6
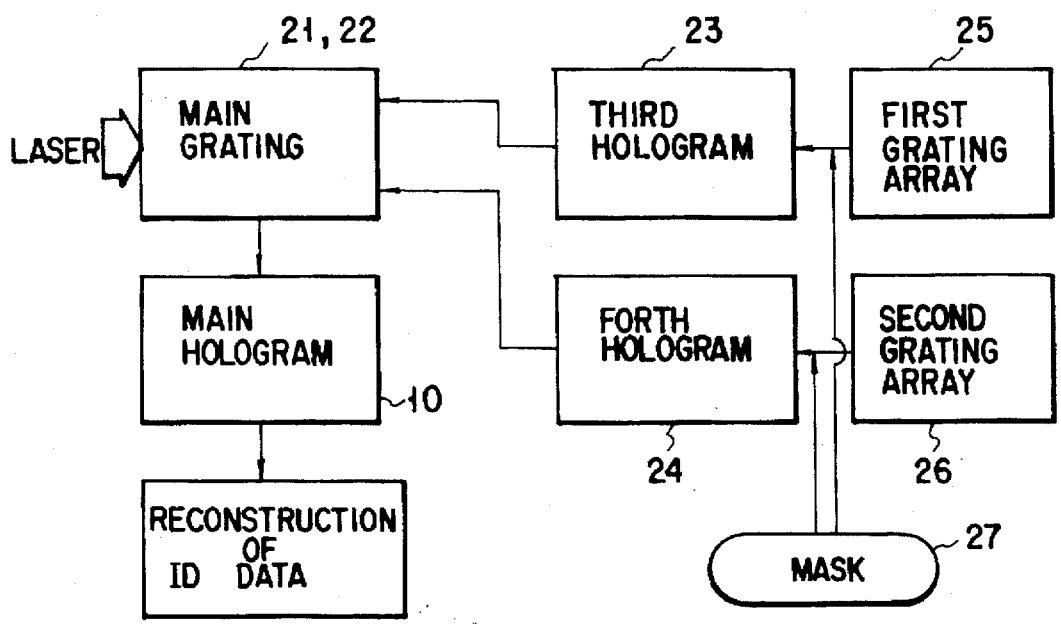
F I G. 7

HOLOGRAM IN WHICH A PLURALITY OF AREAS ARE SET AND HOLOGRAPHY SYSTEM TO WHICH HOLOGRAM IS APPLIED

BACKGROUND OF THE INVENTION

1. Field of the Invention

The present invention relates to a hologram and a holography system and, more particularly, to a hologram in which a plurality of areas are set to provide an effective countermeasure against counterfeits and a holography system to which this hologram is applied.

2. Description of the Related Art

Holography is a technique for recording and reconstructing optical wavefronts of a wave or light. In particular, various studies have been made in the optics since the development of a laser serving as a light source excellent in coherency. A hologram is a medium on which a pattern (fringes) representing certain information of an object serving as a recording target is recorded. A hologram is generally formed as follows. Object light (light reflected by an object) is irradiated on a sensitive material, and at the same time reference light is irradiated thereon, so that interference fringes produced by the object light and the reference light are formed on the sensitive material. An object image is then recorded (photographed) to form a hologram.

When light (illumination light) identical to the reference light in the photographic operation is irradiated on the resultant hologram, light (i.e., reconstruction light or diffraction light) identical to the object light is reconstructed by wave diffraction by the interference fringes. An observer can recognize recorded object information as a reconstructed image, or a detector can identify the recorded information.

In recent years, such holograms are applied to ID cards to identify authentic cardholders, or security cards to manage entrance to predetermined zones. For example, a hologram recorded with information which guarantees the status of a cardholder is attached to part of the surface of, e.g., an ID or security card, and this hologram is identified to recognize the ID or guarantee the security.

Such an ID or security card, however, may often be counterfeited by a third party. For this reason, a hologram applied to the ID or security card may also be counterfeited.

The following two typical methods are generally available to counterfeit the hologram. The first method is a method of forming an object (information) recorded in the hologram and photographing the formed object by holographic method to counterfeit the hologram on the basis of the image reconstructed from the hologram serving as a counterfeit target.

The second method is a so-called contact copy method. The contact copy method is a method of placing a sensitive material on the hologram as a counterfeit target and irradiating light onto the hologram and the sensitive material to copy a diffraction grating on the hologram onto the sensitive material. In this case, the light irradiated on the hologram and the sensitive material must be incident thereon at the same incident angle as that of the reference light irradiated to photograph the hologram.

The hologram counterfeited by either method described above allows easy recognition of a reconstructed image upon irradiation of reference light by the third party who has counterfeited the hologram. For this reason, it is very difficult to determine from the outer appearance that this hologram is a counterfeit.

SUMMARY OF THE INVENTION

It is the first object of the present invention to provide a hologram which can hardly be counterfeited and a holography system to which this hologram is applied.

It is the second object of the present invention to provide a holography system for detecting an object (information) recorded on a hologram which can hardly be counterfeited.

It is the third object of the present invention to provide a holography system capable of mass-producing a hologram which can hardly be counterfeited.

According to the first aspect of the present invention, there is provided a hologram comprising a plurality of recording areas each of which records interference fringes between each of different reference light beams and object light of an image serving as a reconstruction target.

With this arrangement, pieces of information (i.e., a pattern and an image) are recorded with reference light components in directions different in units of different small areas in this hologram. For this reason, even if illumination light having a uniform wavefront is irradiated on this hologram, it is difficult to detect all the pieces of information (i.e., a pattern and an image). In addition, it is also impossible to directly copy or counterfeit (i.e., contact copy) this hologram. If a hologram formed by the present invention is forcibly copied by the contact copy method, it is very difficult to determine the incident direction of reference light upon photography. The incident angle upon counterfeiting is slightly offset from the accurate incident angle of reference light. For this reason, since reference light is incident on an area different from that of the original hologram upon reading desired information, wrong information is read or the reconstruction direction of information to be read out deviates from a correct direction.

According to the second aspect of the present invention, there is provided a method of detecting an image recorded on a hologram having a plurality of recording areas each of which records interference fringes between each of different reference light beams and object light of an image serving as a reconstruction target, comprising the steps of: a) irradiating the reference light beam corresponding to each recording area of said hologram on the recording area as illumination light; b) receiving reconstructed light from each recording area of said hologram upon irradiation of the illumination light; and c) detecting an image recorded on said hologram on the basis of the reconstructed light from each recording area.

According to this detection method, diffraction/reflection beams are incident on a hologram from interference fringes whose spatial frequencies are different in units of element holograms, and an image and information such as the ID data of the hologram are detected from the reconstructed image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a view showing the concept for explaining formation of the grating shown in FIG. 1;

FIG. 3 is a view showing the concept for explaining formation of the first hologram shown in FIG. 1;

FIG. 6 is a view showing the concept of a holography system for reconstructing (detecting) ID data recorded (photographed) on the hologram of the present invention;

FIG. 7 is a block diagram showing the relationship between the main grating and the main hologram in detecting ID data shown in FIG. 6 and the relationship between the grating array and the hologram used and formed in forming the main grating;

DETAILED DESCRIPTION OF THE PREFERRED EMBODIMENTS

An embodiment of a hologram according to the present invention and a holography system to which this hologram is applied will be described below.

Figure 1:
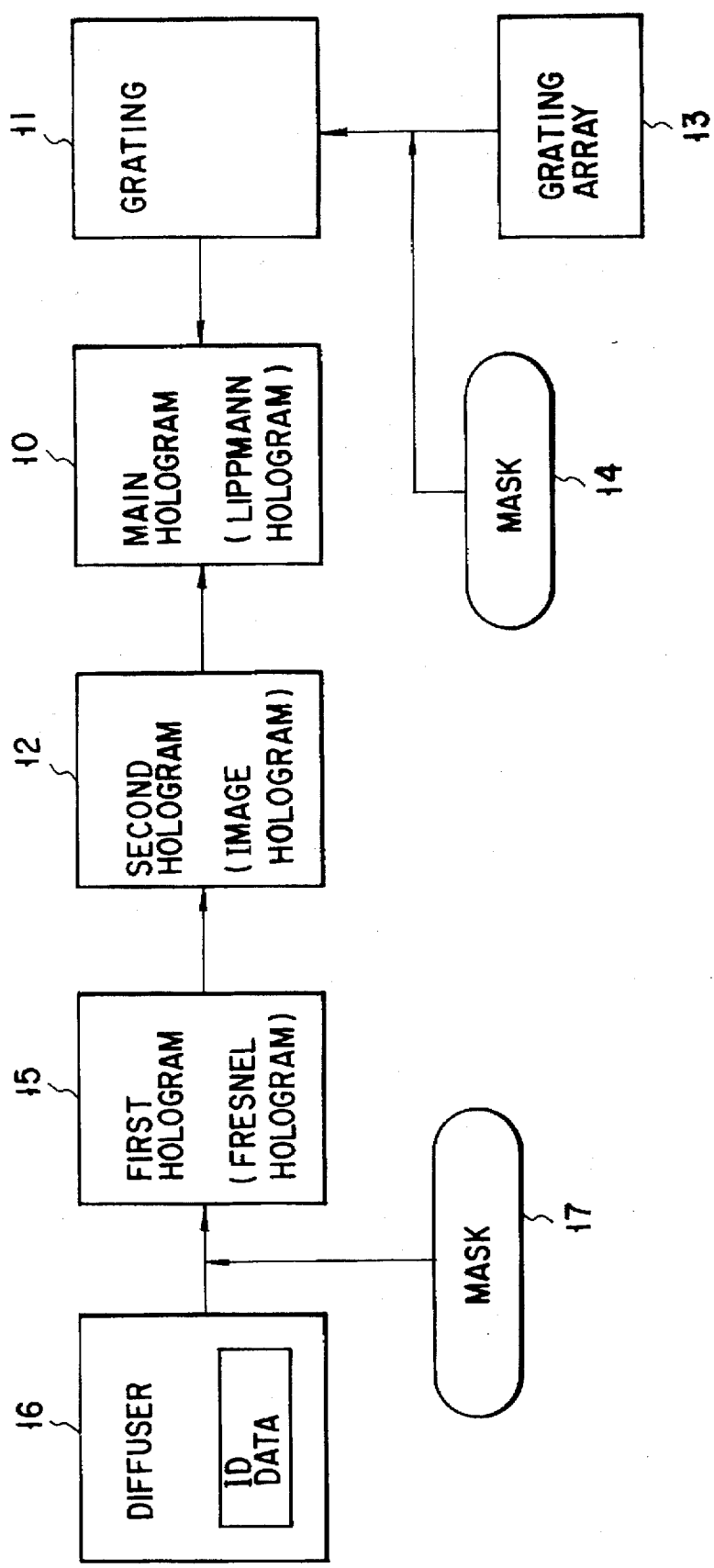
FIG. 1 is a block diagram showing the relationship between various holograms and a grating, which are used in forming a hologram (main hologram) according to the present invention.

The relationship between various holograms and a grating, which are used and formed in forming a hologram (main hologram) according to the present invention is shown in FIG. 1. As shown in FIG. 1, according to this embodiment, a main hologram 10 is a reflection type volume hologram, so-called Lippmann hologram. This main hologram 10 is formed using a grating 11 and a second hologram 12.

The grating 11 is constituted by a plurality of areas whose spatial frequencies and diffraction directions are different from each other. This grating 11 is formed using a grating array 13 and a mask 14.

In this embodiment, the second hologram 12 is an image hologram. The second hologram 12 has a plurality of areas, and information (ID data in this embodiment) as a recording target recorded in each area is recorded as an element hologram. The second hologram 12 is formed using a first hologram 15 serving as a Fresnel hologram. The first hologram 15 is formed using a mask 17 and a diffuser 16 on which ID data is projected.

The formation processes will be described in the order of the grating 11, the first hologram 15, the second hologram 12, and the main hologram 10 with reference to the accompanying drawings.

First of all, the formation process of the grating 11 will be described with reference to FIG. 2. As shown in FIG. 2, the mask 14 is disposed just in front of a sensitive material 111. A light passing hole 14a corresponding to each area size is formed in the mask 14 so as to expose the sensitive materials 111 in a plurality of divided areas. The mask 14 is movable in the horizontal and vertical directions (x and y directions) by a distance corresponding to the area size for each exposure of each area and is thus set to expose the entire area of the sensitive material 111.

On the other hand, a plurality of areas 13a whose spatial frequencies and diffraction directions are different from each other are formed in the grating array 13. An optical lens system 112 is arranged between the grating array 13 and the sensitive material 111.

The positional relationship between the grating array 13 and the sensitive material 111 with respect to the optical lens system 112 is determined such that the grating array 13 is arranged on the front focal plane of the optical lens system 112 and the sensitive material 111 is arranged on the rear focal plane of the optical lens system 112.

A reference light optical system 113 for irradiating reference light onto the sensitive material 111 at a predetermined angle through the mask 14 is disposed obliquely in front of the sensitive material 111. The reference light irradiated from the reference light optical system 113 may be applied from many kinds of light, for example parallel light, plane light, converging light, and diverging light.

With this arrangement, when a laser beam is irradiated on an arbitrary area 13a on the grating array 13, the laser beam is diffracted by the diffraction grating of the area 13a in a predetermined direction. The diffracted laser beam passes through the optical lens system 112, further passes through the light passing hole 14a of the mask 14, and is irradiated on the sensitive material 111 at a predetermined incident angle. In this case, the laser beam components except for the +1st-order (or −1st-order) light component diffracted by the diffraction grating of the area 13a are shielded by the mask 112a as shown in FIG. 2 which is combined in lens system 112.

When the laser beam passes through the light passing hole 14a and is irradiated on the sensitive material, and at the same time reference light from the reference light optical system 113 passes through the light passing hole 14a at a predetermined angle and is then irradiated on the sensitive material 111, interference between the laser beam and the reference light occurs. Interference fringes formed by this interference are recorded on a small area of the sensitive material 111 which has the same size as that of the light passing hole 14a.

The mask 14 is then moved to locate the light passing hole 14a at a position different from its previous position. In this state, a laser beam is irradiated on another area 13b different from the area 13b of the grating array 13. Then, the irradiated laser beam is diffracted by the diffraction grating of the area 13b in a direction different from the direction of the beam diffracted by the area 13a. The diffracted laser beam passes through the optical lens system 112 and the light passing hole 14a in the same manner as described above and is irradiated on the sensitive material 111 at an angle different from that described above. At the same time, reference light from the reference light optical system 113 passes through the light passing hole 14a and is incident on the sensitive material 111 at a predetermined angle, interference occurs between the laser beam and the reference light, and interference fringes by this interference are recorded in the area of the sensitive material 111. Note that this recording area is different from that recorded with the laser beam from the area 13a of the grating array 13.

Subsequently, the position of the light passing hole 14a of the mask 14 is properly shifted, and laser beams are respectively irradiated on areas 13c to 13n (where n is the number of areas) of the grating array 13, and interference fringes between the diffracted laser beams and the reference light are recorded on the corresponding areas of the sensitive material 111. As a result, the interference fringes are recorded on each area of the sensitive material 11, thereby forming the grating 11.

The formation process of the first hologram 15 will be described with reference to FIG. 3. As shown in FIG. 3, the mask 17 is disposed just in front of a sensitive material 151, and the diffuser 16 is arranged on an IP (Imaging Plane) surface spaced apart from the sensitive material 151 by a distance D. Note that a light passing hole 17a corresponding to each area size for exposing the sensitive material 151 in a plurality of exposure areas is formed in the mask 17. The mask 17 is movable in the horizontal and vertical directions by a distance corresponding to the area size for each exposure of each area and is thus controlled and moved to expose the entire area of the sensitive material 151.

A reference light optical system 152 for irradiating reference light on the sensitive material 151 at a predetermined incident angle is arranged obliquely in front of (i.e., a direction toward the diffuser 16) the sensitive material 151.

With the above arrangement, a pattern representing desired ID pattern (specified as an ID number and a name in FIG. 3) is projected on the diffuser 16. When the pattern is projected on the diffuser 16, the scattering wavefront of the projected pattern is irradiated on the sensitive material 151 through the light passing hole 17a. At the same time, parallel reference light is irradiated from the reference light optical system 152 to the sensitive material 151 through the light passing hole 17a. Interference occurs between the scattering wavefront of the pattern and the reference light, and interference fringes caused by this interference are recorded as an element hologram in one area of the sensitive material 151.

The mask 17 is moved by an amount (horizontal direction and/or vertical direction) corresponding to the size of each area of the sensitive material 151. In addition, a pattern different from the pattern described above is projected on the diffuser 16. For example, as shown in FIG. 3, a pattern representing the name of department or contact address may be projected because the previous pattern (ID data) specifies the ID number and name. When the scattering wavefront of the second pattern projected on the diffuser 16 is irradiated on the sensitive material 151 through the light passing hole 17a, and at the same time parallel reference light is irradiated on the sensitive material 151, interference fringes between the scattering wavefront of the second pattern and the reference light are recorded as an element hologram (i.e., an element hologram different from the previously recorded element hologram) on one area of the sensitive material 15 (this recording area is different from the previously recording area).

Subsequently, the scattering wavefront of each pattern from the diffuser 16 is interfered with the reference light to form interference fringes. The interference fringes are recorded as an element hologram on an area different from the above area of the sensitive material 151. By this process, the sensitive material 151 is developed to form the first hologram 15.

In this embodiment, the reference light irradiated from the reference light optical system 152 is applied parallel reference light. The reference light, however, may be applied another type of light, for example plane light, converging light, and diverging light.

Figure 4:
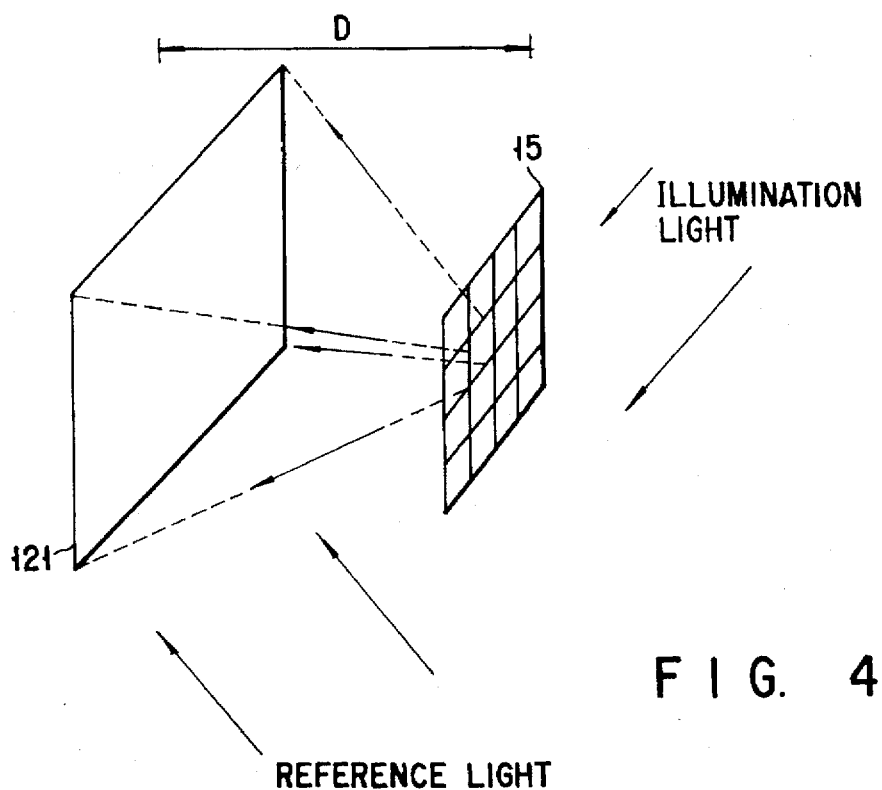
FIG. 4 is a view showing the concept for explaining formation of the second hologram shown in FIG. 1.

The formation process of the second hologram 12 will be described with reference to FIG. 4. As shown in FIG. 4, a sensitive material 121 is arranged at an IP (Imaging Plane) surface spaced apart forward from the first hologram 15 by the distance D. In this case, parallel illumination light is irradiated on the first hologram 15 in a direction opposite to the irradiation direction of the parallel reference light (FIG. 3) irradiated from the reference light optical system 152 to the first hologram 15. Reconstruction light having the same wavefront as the scattering wavefront in the direction of the IP surface is reconstructed from the first hologram 15, and the pattern recorded in each element hologram of the first hologram 15 is reconstructed as a real image on the IP surface. In this manner, the reconstructed light is irradiated on the sensitive material 121. At the same time, parallel reference light is irradiated on the sensitive material 121 at a predetermined incident angle to cause interference between the parallel reference light and the light reconstructed from the first hologram 15, thereby recording interference fringes on the sensitive material 121. As a result, the sensitive material 121 is formed as the second hologram 12 serving as an image hologram.

As described above, in the respective formation processes, the grating 11 and the second hologram 12 are formed. The formation process of the main hologram 10 using the grating 11 and the second hologram 12 will be described with reference to FIG. 5.

Figure 5:
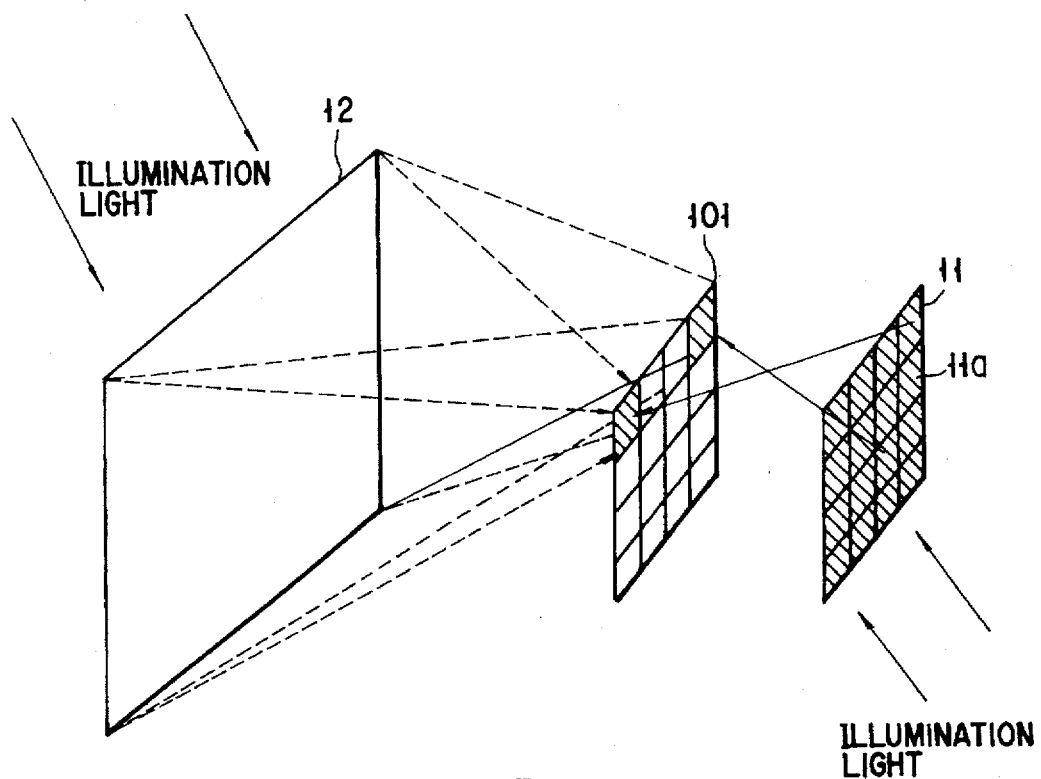
FIG. 5 is a view for explaining formation of the hologram (main hologram) shown in FIG. 1.

As shown in FIG. 5, the grating 11 formed in the above formation process is arranged on one side of a sensitive material 101, and the second hologram 12 serving as an image hologram is arranged on the other side.

With this arrangement, illumination light having the same wavefront as that of the reference light from the reference light optical system 113 (FIG. 2) in the forming process of forming the grating 11 is irradiated on the grating 11. Upon irradiation of this illumination light, diffracted light components whose spatial frequencies and diffraction directions are different from each other in units of areas 11a of the grating 11 are generated. These diffracted light components are irradiated on the sensitive material 101. Illumination light having a wavefront conjugate to that of the parallel illumination light (FIG. 4) irradiated in formation of the second hologram 12 is irradiated on the second hologram 12 in a direction (incident angle) opposite to the irradiation direction (incident angle) of the parallel reference light in FIG. 4. Upon irradiation of this illumination light, reconstruction light for reconstructing the pattern recorded on the second hologram 12 is irradiated on the sensitive material 101.

The light reconstructed from the grating 11 and the light reconstructed from the second hologram 12 are irradiated on the sensitive material 101. By these reconstructed light components, a reflection (volume) hologram, i.e., the main hologram 10 is formed. That is, the light components whose spatial frequencies and diffraction directions are different in units of areas of the grating 11 are irradiated as reference light for the main hologram 10.

As a result, this hologram 10 is a hologram which patterns are recorded with reference light beams whose incident directions are different in units of different small areas.

According to this embodiment, since pieces of information (patterns) are recorded with reference light beams having different incident directions in units of different small areas, even if illumination light having a uniform wavefront is irradiated on this main hologram 10, it is difficult to detect all the pieces of information (patterns). In addition, it is also impossible to directly copy and counterfeit (i.e., contact copy) this main hologram 10. If a hologram (main hologram 10) formed by the present invention is forcibly copied by the contact copy method, it is very difficult to determine the incident direction of reference light upon formation. The incident angle upon counterfeiting is slightly offset from the accurate incident angle of reference light. For this reason, since reference light is incident on an area different from that of the original hologram upon information reading, wrong information is read or the reconstruction direction of information to be readout deviates from a correct direction. Therefore, it is impossible to counterfeit the hologram (main hologram 10), and a counterfeit information hologram can be easily detected. When the number of areas of the main hologram 10 is increased, a hologram which can hardly be counterfeited can be formed.

If the grating 11 and the second hologram 12 serving as an image hologram, both of which are the initially used optical elements, are available, holograms identical to the main hologram 10 formed first can be easily mass-produced upon irradiation of the respective light components reconstructed from the grating 11 and the image hologram 12 on the sensitive material.

That is, it is difficult to directly copy the main hologram 10. However, if the grating 11 and the second hologram 12, which are the initially used optical elements, are available, the main hologram 10 can be copied in a large quantity and mass-produced easily.

A holography system for detecting ID data (pattern) stored in the main hologram 10 will be described with reference to the accompanying drawings. A state in which ID data (pattern) is detected from the main hologram 10 using this holography system is shown in FIG. 6.

In this embodiment, the main hologram 10 is adhered to a security card 20. Volume gratings 21 and 22 are located at a position spaced apart above from this main hologram 10 by a distance D. Each of the volume gratings 21 and 22 comprises a plurality of element holograms whose spatial frequencies and angles are different from each other. The grating 21 is identical to the grating 22. In FIG. 6, two gratings for simultaneously reconstructing ID data (pattern) recorded on two different areas 10a and 10b of the main hologram 10 are used. If the ID data (pattern) recorded on the respective areas of the main hologram 10 are sequentially reconstructed, only one of the gratings 21 and 22 can be used. A laser scanner 50 comprises a laser oscillator 51, and a scanning optical system 52 for controlling to scan a laser beam from the laser oscillator 51 on the volume gratings 21 and 22.

The formation process of each volume grating 21 or 22 (to be referred to as a main grating hereinafter) will be described in detail later. The relationship between the main grating and the main hologram in detecting ID data and the relationship between the grating and the grating array used and formed informing the main grating are shown in FIG. 7. As shown in FIG. 7, the reconstructed light obtained upon irradiation on the main gratings 21 and 22 is irradiated on the main hologram 10 as illumination light, thereby reconstructing recorded ID data (pattern). The main gratings 21 and 22 are formed by third and fourth holograms 23 and 24. These third and fourth holograms 23 and 24 are also formed using first and second grating arrays 25 and 26, respectively. In this case, a mask 27 is also used.

Figure 8:
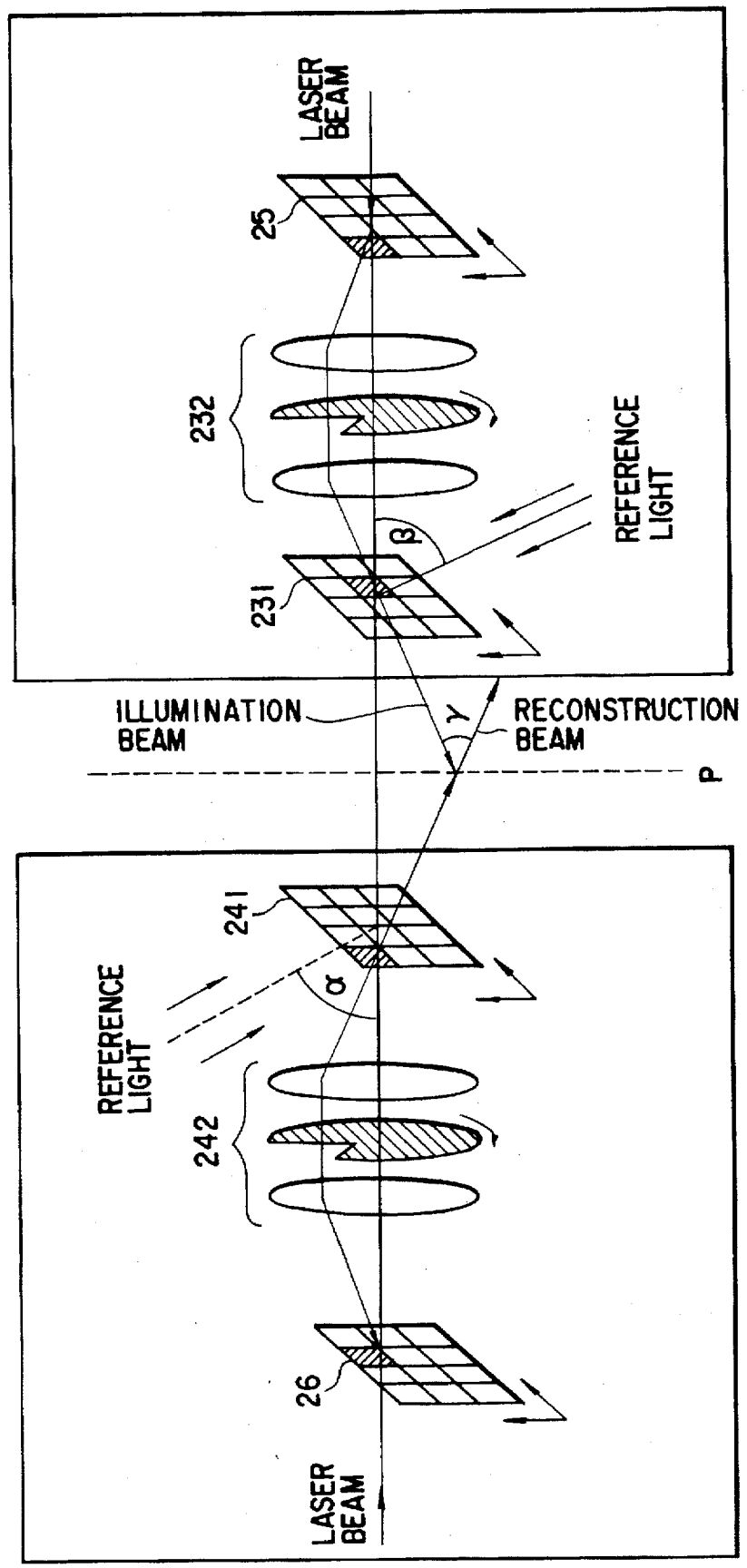
FIG. 8 is a view showing the concept for explaining formation of first and second gratings shown in FIG. 7.

The formation process of the main gratings 21 and 22 will be described with reference to the accompanying drawings. As shown in FIG. 8, the grating array 25 is located on one surface side of a sensitive material 231 through an optical lens system 232 in which a mask is inset to cut off diffracted beams from grating array 25, except for +1 or −1 order beam. The grating array 25 has a plurality of element holograms whose spatial frequencies and diffraction directions are different from each other. The positions of the grating array 25 and the sensitive material 231 with respect to the optical lens system 232 are determined such that the grating array 25 is located on the front focal plane of the optical lens system 232 and the sensitive material 231 is located on the rear focal plane of the optical lens system 232. Reference light is incident on the sensitive material 231 at a predetermined angle from a direction obliquely forward from the sensitive material (i.e., the direction toward the optical lens system 232). The reference light could be an arbitrary wavefront. The reference light is incident at an incident angle β with respect to the axis along which the grating array 25, the optical lens system 232, and the sensitive material 231 are arranged. In addition, although not shown in FIG. 8, a mask having a light passing hole of a predetermined size is located near the sensitive material 231 on the optical lens system 232 side such that the light passing hole can be shifted.

On the other hand, the grating array 26 is arranged on one surface side of a sensitive material 241 through an optical lens system 242. The grating array 26 has a plurality of element holograms whose spatial frequencies and diffraction angles are different from each other as in the grating array 25. The positions of the grating array 26 and the sensitive material 241 with respect to the optical lens system 242 are determined such that the grating array 26 is located on the front focal plane of the optical lens system 242 and the sensitive material 241 is located on the rear focal plane of the optical lens system 242. Reference light is incident on the sensitive material 241 from a direction obliquely forward from the sensitive material 241 (i.e., the direction toward the optical lens system 242). The reference light could be an arbitrary wavefront. The reference light is incident at an incident angle α with respect to the axis along which the grating array 25, the optical lens system 232, and the sensitive material 231 are arranged. In addition, although not shown in FIG. 8, a mask having a light passing hole with a predetermined size is located near the sensitive material 231 on the optical lens system 232 side such that the light passing hole can be shifted.

The spatial frequencies and angles of the gratings formed in the respective areas of the grating arrays 25 and 26 are set such that the reconstructed light beams from the third and fourth holograms 23 and 24 formed upon exposure of the sensitive materials 231 and 241 cross on the P plane in FIG. 8.

With this arrangement, when a laser beam is irradiated on one of the plurality of areas on the grating array 25, the laser beam is diffracted in a predetermined direction by the diffraction grating set in this area. The diffracted laser beam passes through the optical lens system 232 and is irradiated on an arbitrary area of the sensitive material 231 through the mask at a predetermined angle. In this case, the laser beam except for the +1th-order (or −1th-order) diffracted light component from the diffraction grating of the grating array 25 is shielded by the mask which is inset in the lens system 232, as shown in FIG. 8. In this manner, the laser beam is irradiated on the sensitive material 231. At the same time, when the reference light is irradiated on the sensitive material 231 at the predetermined angle β, interference occurs between the laser beam and the reference light. The interference fringes formed by this interference are recorded as an element hologram in a small area of the sensitive material 231.

When the position of the light passing hole of the mask is shifted, the laser beam is irradiated on another area different from the previously irradiated area on the grating array 25. The laser beam irradiated and diffracted on this area is irradiated on the sensitive material 231 through the optical lens system 232 at another angle. At the same time, when reference light is irradiated on the sensitive material 231 at the predetermined angle β, interference occurs between the laser beam and the reference light. Interference fringes are recorded as an element hologram on another area different from the previously recorded area on the sensitive material 231.

Subsequently, laser beams are irradiated on different areas of the grating array 25, and interference fringes between the diffracted laser beams and the reference light beams are recorded as element holograms on other areas different from the previously recorded areas on the sensitive material 231. Therefore, the sensitive material 231 is formed as the third hologram 23.

On the other hand, laser beams are irradiated on different areas of the grating array 26, and interference fringes between the diffracted laser beams and the reference light beams are recorded as element holograms on these areas of the sensitive material 241 in the same manner as in the sensitive material 231. Therefore, the sensitive material 241 is formed as the fourth hologram 24. In this case, the laser beam except for the +1th-order (or −1th-order) diffracted light component from the diffraction grating of the grating array 26 is shielded by the mask which is inset in the lens system 242.

The reference light used in the forming process of the third and fourth holograms 23 and 24, may be applied many kinds of light, for example parallel light, plane light, converging light, and diverging light.

Figure 9:
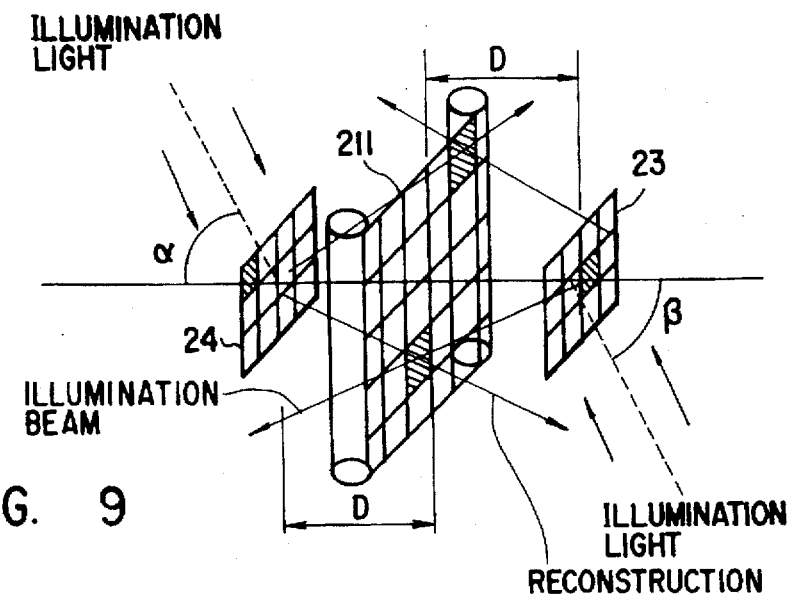
FIG. 9 is a view showing the concept for explaining formation of a main grating shown in FIG. 7.

As shown in FIG. 9, the resultant third and fourth holograms 23 and 24 are located to oppose each other, and a sensitive material 211 is located between these third and fourth holograms 23 and 24. The distance between the sensitive material 211 and the third or fourth hologram 23 or 24 is set to a distance D. More specifically, the third and fourth holograms 23 and 24 are spaced part from each other by the same distance as between the sensitive materials 231 and 241 shown in FIG. 8. At the same time, the sensitive material 211 is located on the P plane. In this state, illumination light having the same wavefront as that of the reference light is irradiated on the third hologram 23 at the predetermined angle β, and at the same time illumination light having the same wavefront as that of the reference light is irradiated on the fourth hologram 24 at the predetermined angle α.

Different reconstructed light components are generated by the respective element holograms of the third and fourth holograms 23 and 24 upon irradiation of these illumination light beams. These reconstructed light components are irradiated on the sensitive material 211. Element holograms are respectively formed on a plurality of areas of the sensitive material 211. These element holograms are formed as the main gratings 21 and 22. Volume interference fringes having different spatial frequencies in units of element holograms are recorded on these main gratings 21 and 22. In the case, these illumination light beams output from the third and fourth holograms 23 and 24 have a relationship between illumination beam and reconstruction beam each of the element holograms of the main gradings 21 and 22. Assuming that an element hologram of 21a of the main grating 21 is formed and that an angle between the illumination beam and the reconstruction beam is an angle γ° as shown in FIG. 8, the laser beam output from the laser oscillator 51 is irradiated by the element hologram of 21a of the main grating 21 at the angle γ° as shown in FIG. 6.

With this arrangement, as shown in FIG. 6, the scanning positions of the laser beam output from the laser oscillator 51 are controlled by the scanning control system 52. The laser beams are irradiated on given element holograms of the main gratings 21 and 22. A single diffracted/reflected beam from each element hologram is incident on a given element hologram of the main hologram 10. The ID data (pattern) recorded on the main hologram 10 for the first time is reconstructed from the main hologram 10 at a position spaced apart by the distance D. ID data to be read from the main hologram 10 is obtained by strictly calculating the recording parameters of the main gratings 21 and 22 and the main hologram 10 and controlling the laser beam scanning position of the laser scanner 50.

According to this holography system, beams diffracted and reflected by the main gratings 21 and 22 having different spatial frequencies in units of element holograms are incident on a given element hologram of the main hologram 10, and ID data (pattern) of the main hologram 10 is detected from this reconstructed image. Therefore, specific ID data (information) can be read from a specific element hologram of the main hologram 10.

Figure 10:
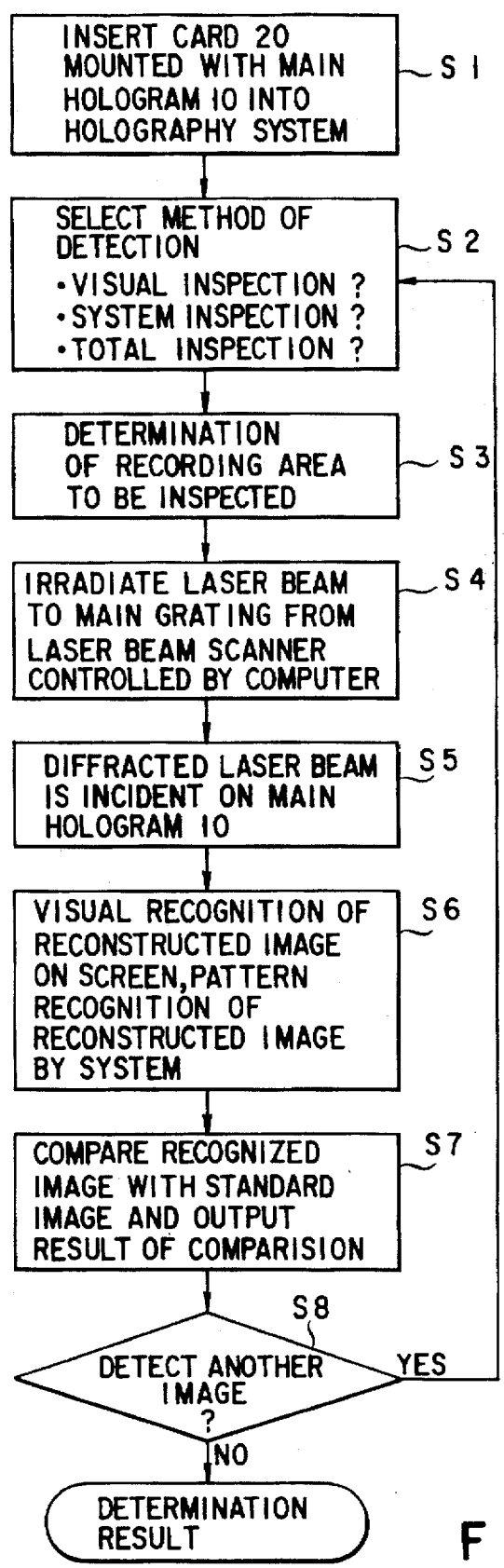
FIG. 10 is a flow chart for explaining an ID data detection process in the holography system shown in FIG. 6.

The ID data detection process using this holography system will be described with reference to the flow chart in FIG. 10. A security card to which the main hologram 10 serving as a detection target is attached is inserted to a predetermined position in the system (step S1). A method of detection is determined and selected as visual inspection, system inspection, or total inspection depending on the type of security card (step S2). The visual inspection is a method of allowing an operator who is attending the holography system to recognize the reconstructed image of the hologram, thereby inspecting the security card. The system inspection is a method of causing the system to detect and recognize a reconstructed image, thereby inspecting the security card. In the system inspection, a system has a function of recognizing a reconstructed image which cannot be visually checked with a human eye. The total inspection is a method of performing inspection combining the operator inspection and the system inspection.

A recording area of the main hologram 10 from which ID data (pattern) is to be recognized is determined for the inserted card (step S3). This determination may be performed depending on the application purpose of the card. When the inspection method and the area for detecting ID data are determined in steps S2 and S3, laser beams are irradiated on the main gratings 21 and 22 so as to reproduce ID data recorded in the area determined in step S3 (step S4). This laser beam irradiation is performed by the laser beam scanner 52 under the control of the computer. The laser beams irradiated on the main gratings 21 and 22 are diffracted in manners which differ depending on the irradiated areas of the main gratings 21 and 22. The diffracted laser beams are irradiated on the area of the main hologram 10 which is determined in step S3 (step S5).

Light reconstructed from the main hologram 10 is generated upon irradiation of the diffracted beams. The diffraction wavefront of the reconstructed light is formed at a position spaced apart from the main hologram 10 by the distance D. By detecting the diffraction wavefront at this position, ID data recorded in the area of the main hologram 10 irradiated with the diffracted beams can be detected (step S6). For example, when the visual inspection is determined in step S2, a screen is located at a position spaced apart from the main hologram 10 by the distance D to confirm the reconstructed image. When the system inspection is determined in step S2, if a sensor is located at the position spaced apart from the main hologram 10 by the distance D, information which cannot be discriminated with a human eye can also be detected. If the total inspection is determined in step S2, the above detection processes are combined to detect ID data recorded in a predetermined area of the main hologram 10.

The detected ID data is compared with data (standard information) held in advance in the memory of the holography system, and the ID data recorded in the area of the main hologram 10 irradiated with the diffracted beams can be recognized (step S7).

It is then determined whether ID data stored in other areas of the main hologram 10 are to be detected (step S8). If other ID data are to be detected, the flow returns to step S2 to execute a process for detecting ID data. If no other ID data need be detected, a determination result is output from the detected ID data. In this case, if ID data which does not satisfy a predetermined condition is recognized, the system detects that the inserted security card is not an authentic card, but a counterfeit card.

In the above processes, ID card recorded on the main hologram 10 attached to a security card or the like can be detected.

In the main gratings 21 and 22 and the main hologram 10, volume interference fringes having different frequencies are recorded in the respective element holograms. All the element holograms cannot be reconstructed together with illumination having a uniform illumination wavefront from an arbitrary direction. It is difficult to detect the angle of illumination light for each element hologram of the main gratings 21 and 22 and the main hologram 10. It is, therefore, impossible to copy the main gratings 21 and 22 and the main hologram 10.

There is need to store the incident angles of the illumination light for respective element holograms of the main hologram 10. However, in this embodiment, since the main gratings 21 and 22 are produced, there is no need to store a plurality of incident angles as numeral data.

Assume that the main gratings 21 and 22 and the main hologram 10 are counterfeited. In this case, if the incident angle of reference light on each element hologram is offset even slightly, information cannot be read. Otherwise, light is incident on a wrong hologram to detect wrong information. Therefore, the counterfeited main gratings 21 and 22 and the counterfeited main hologram 10 can be easily discriminated.

Figure 11:
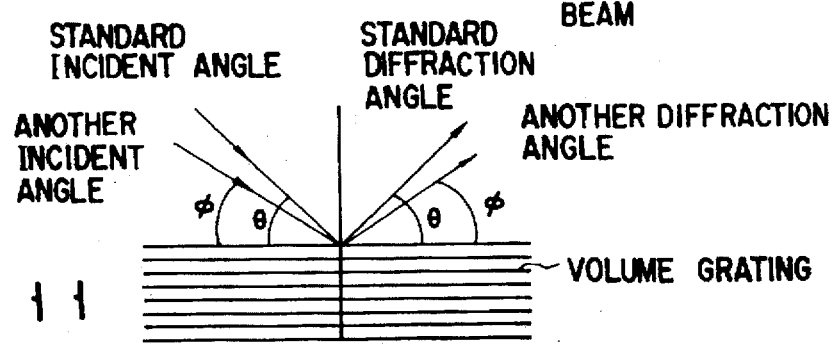
FIG. 11 is a view showing a change in incident angle on a volume grating and a change in reflection/diffraction angle.

A volume grating is generally counterfeited using the contact copy method. As shown in FIG. 11, a method of measuring the intensities of diffracted light components with changes in irradiation angle with respect to the plane of the volume grating and detecting the incident angle and the diffraction angle of the most strongly diffracted light component is available as a method of detecting the incident and diffraction angles of illumination light (reference light) incident on the volume grating.

Figure 12:
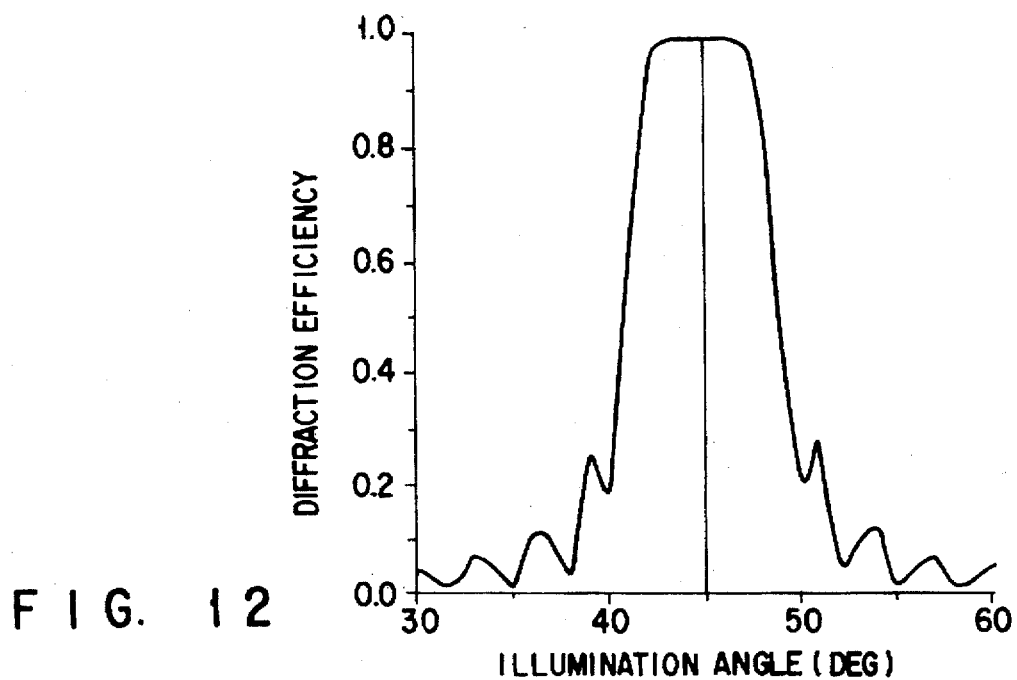
FIG. 12 is a graph showing an example of a change in diffraction efficiency of incident light components at different incident angles when the standard incident angle is 45° in FIG. 11.

Simulation results of the diffraction efficiency obtained with changes in incident angle when the incident angle of the reference light on the volume grating shown in FIG. 11 is 45° are shown in FIG. 12. As shown in FIG. 12, when the incident angle is changed within the range of ±5°, the diffraction efficiency changes little. This indicates that the intensity of diffracted light changes little. The range of ±5° can be widened by changing the type of sensitive material and the thickness of the material emulsion.

A counterfeiter cannot detect the original recording angle (irradiation or diffraction angle of reference or illumination light) of each area with respect to the main hologram 10 or the volume gratings 21 and 22. Even if copying is performed within the range of ±5° of the original incident angle, the irradiated laser beam is diffracted by the volume gratings 21 and 22 and a plurality of volume gratings of the main hologram 10 in detecting information (ID data) recorded on the hologram of the present invention. Finally, the incident angle offset from the IP plane of the reconstructed light irradiated from the main hologram 10 increases. The reconstructed information (ID data) blurs or is shifted in position. Therefore, the counterfeit can be easily discriminated. Unless the hologram formation conditions and holography system described above are used, it is impossible to counterfeit the security hologram (contact copy from the hologram itself) or duplicate the hologram (the hologram is duplicated to form a counterfeit hologram).

It is impossible to counterfeit a hologram according to the present invention. When this hologram is attached to a security card, security of the security card can be improved, and reliability can be improved.

According to a hologram of the present invention, when the grating 11 as an initially used optical system and the second hologram 12 serving as an image hologram are available, and reconstructed light components from the grating 11 and the image hologram 12 are irradiated on a sensitive material, holograms identical to the initially formed main hologram 10 can be copied and mass-produced. As for a holography system according to the present invention, if the third and fourth holograms 23 and 24 as an initially used optical system are available, and diffracted light components from the third and fourth holograms 23 and 24 are irradiated on a sensitive material, volume gratings identical to the initially formed volume gratings (main gratings) 21 and 22 can be easily copied and mass-produced, as shown in FIG. 9.

As has been described above, according to the present invention, there are provided a hologram which can hardly be counterfeited, a holography system using this hologram, and a holography system for detecting an object (information) recorded (photographed) on the hologram which can hardly be counterfeited. In addition, the hologram which can hardly be counterfeited can be mass-produced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A hologram comprising a plurality of recording areas each of which contains recorded interference fringes between each of different reference light beams and object light of an image serving as a reconstruction target, said hologram prepared by the process comprising the steps of:

a) producing an image hologram having a plurality of areas each of which records information serving as a recording target as an element hologram;

b) producing a grating being constituted by a plurality of areas whose spatial frequencies and diffraction directions are different from each other; and c) irradiating object light and reference light onto each recording areas being set in a sensitive material to form said hologram, the object light is reconstruction light output from the element hologram of the image hologram, the reference light is reconstruction light output from the grating.

2. A hologram according to claim 1, wherein said hologram is a Lippmann hologram.

3. A hologram according to claim 1, wherein the image is divided into a plurality of patterns which are recorded in a plurality of recording areas of an image hologram.

4. A hologram according to claim 1, wherein the image is a wavefront representing information.

5. A hologram according to claim 1, wherein the image is a code representing at least one of a character, a numerical value, and a symbol.

* * * * *